Patented Oct. 9, 1923.

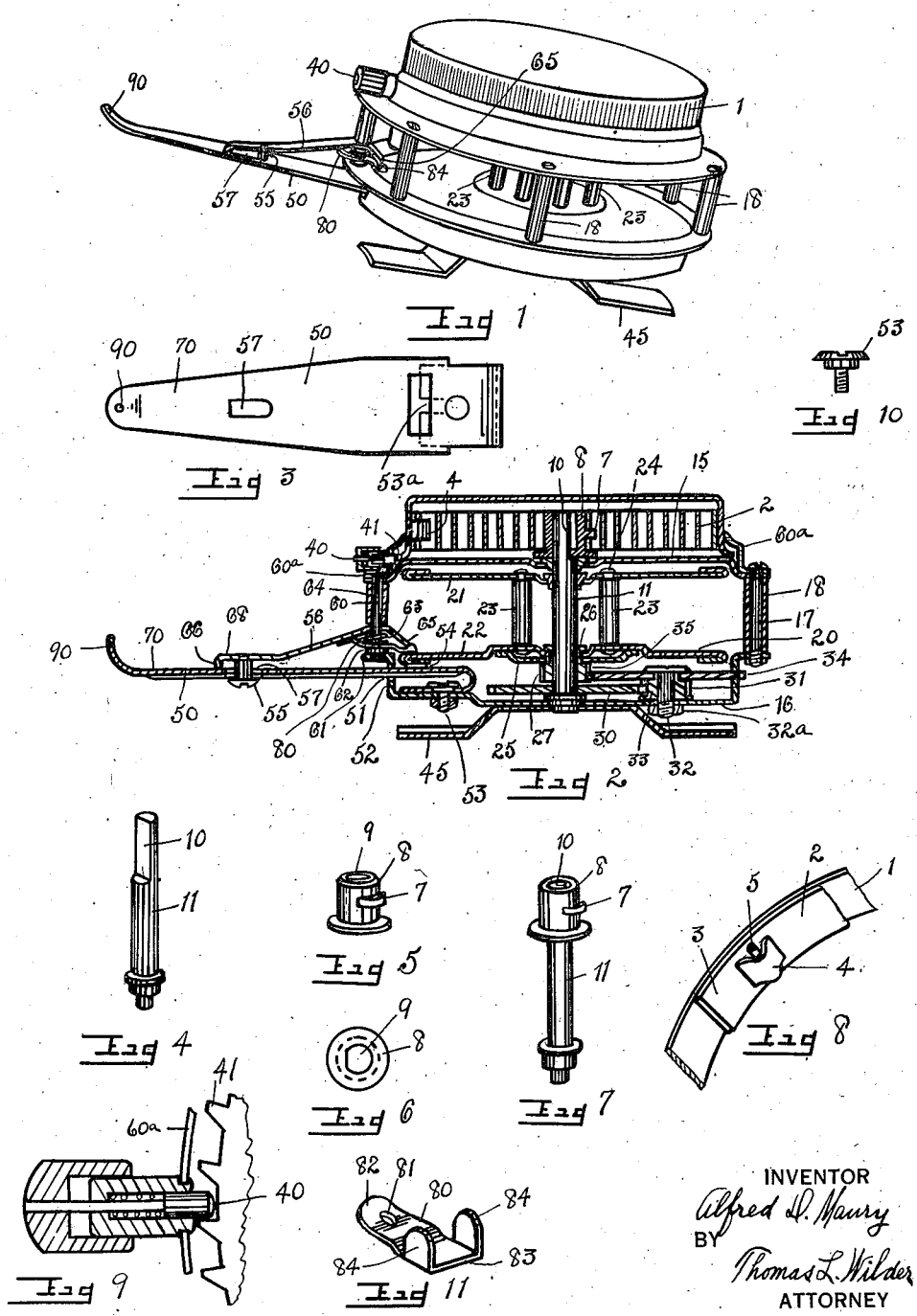

1,469,845

UNITED STATES PATENT OFFICE.

ALFRED D. MAURY, OF ILION, NEW YORK, ASSIGNOR TO MARTIN AUTOMATIC FISHING REEL COMPANY, OF MOHAWK, NEW YORK, A CORPORATION OF NEW YORK.

AUTOMATIC FISHING REEL.

Application filed June 14, 1921. Serial No. 477,370.

*To all whom it may concern:*

Be it known that I, ALFRED D. MAURY, a citizen of the United States, residing at Ilion, in the county of Herkimer and State of New York, have invented certain new and useful Improvements in Automatic Fishing Reels, of which the following is a specification, reference being had therein to the accompanying drawing.

My invention relates to an automatic fishing reel and I declare the following to be a full, clear, concise, and exact description thereof sufficient to enable anyone skilled in the art to which it appertains to make and use the same, reference being had to the accompanying drawings in which like reference characters refer to like parts throughout the specification.

The object of the invention is to provide an automatic fishing reel that will have a brake adapted to stop the rotation of the line spool either when the fish is pulling the line out or when the main spring of the spool is winding it in, at the will of the user. Furthermore, the reel is equipped with a novel hub having a dog formed integral therewith for holding one end of the main spring. The object will be understood by referring to the drawings in which:

Fig. 1 is a perspective view of the automatic fishing reel;

Fig. 2 is a central section of the fishing reel, showing certain parts in full;

Fig. 3 is a detail plan view of a lever employed;

Fig. 4 is a perspective view of a shaft employed;

Fig. 5 is a detail perspective view of a hub employed;

Fig. 6 is a detail bottom plan view of the hub shown in Fig. 5;

Fig. 7 is a detail perspective view of the shaft and hub shown in Figs. 4, 5 and 6, and illustrating said parts in assembled position;

Fig. 8 is a detail perspective view in fragment of the wall of the rotary drum employed, showing the manner of securing one end of the main spring thereto;

Fig. 9 is an enlarged detail fragmentary view, showing a releasing dog and other immediate parts employed;

Fig. 10 is an enlarged detail view of a shoulder screw bolt used;

Fig. 11 is an enlarged detail perspective view of a shoe employed.

Referring more particularly to the drawings, the reel comprises the ordinary rotary dum —1— which encloses the main spring 2. One end of the spring 2 is recessed to fit over a loop 4 projecting laterally from the inner side wall of the drum —1—. A pin 5 is employed to hold the end 3 in locked position. The other end 6 of the main spring 2 is recessed to fit over the projecting part of the dog 7 that is formed integral with the hub 8, which is one of the novel features of this device. The hub 8 has a hole 9 through its center part. The hole 9 is broached or squared for about one-eighth part of its length, whereby to cooperate with the milled or squared upper part 10 of the round shaft 11, in order that both may turn together to wind or unwind the main spring 2.

Certain parts that are well known in the art besides the drum and spring embody the upper and lower plates 15 and 16 of the casing. These plates are held mounted at the required distance apart by bolts 17 and spacing sleeves 18. Between the plates 15 and 16 is located the rotary line spool 20 which has the upper and lower disks 21 and 22 respectively that are held in position by shafts 23 and rivets 24. Furthermore, the lower disk 22 engages the spider 25, whereby to turn with said spider 25 which is attached to turn with the upper reduced part of hub 26 of pinion 27. The disk 22 is adapted to slip past the spider 25 if abnormal tension is brought to bear, as when it is desired to reverse the rotation of spool 20.

Hub 26 is mounted to turn independent of the round shaft 11. Below the pinion 27 there is mounted to rotate with the shaft 11 a spur gear 30 that is in mesh with the pinion 31 mounted to turn upon the fixed bolt 32, which is held to casing —1— by nut 32ª screw mounted to the lower end of said bolt 32. The upper reduced part of hub 33 carries another spur gear 34 adapted to turn with said hub 33 and pinion 31. The gear 34 meshes with the pinion 35 mounted to turn with line spool 20. The train of gears and pinions just above described will increase the velocity of revolution of the line spool 20 over that of the shaft 11 by a much greater velocity, whereby to cause the spool 20 to wind the fishing line, not shown, thereon in a comparatively short space of time, as is well known in the art.

A dog 40 engaging ratchet teeth 41 formed on the periphery of the rotary drum —1—, is adapted to allow the drum —1— to revolve in one direction only, whereby to tighten the main spring 2. The said dog is spring actuated and may be withdrawn from engagement with the teeth on the drum, whereby to release the said drum, if desired. The outer surface of the drum —1— is milled or serrated to aid in turning same. The usual reel seat 45 is attached to the lower plate 16 of the casing for the purpose of mounting the reel to a fishing pole, not shown.

Among the other parts that are novel is a brake adapted to stop the rotation of the line spool at the will of the fisherman, either when the fish is pulling the line out or when the main spring 2 is winding the same in. The brake embodies a lever 50 that projects through a recess 51 formed in the lateral wall 52 of the lower plate 16. The lever 50 is bent back upon itself and secured by a shouldered screw bolt 53 engaging an open adjustable recess 53ª enlarged at the end and formed in the free edge of said bent end, to said plate 16. A leather pad or brake 54 is firmly attached by glue or otherwise to the upper surface of the lever 50 and is adapted to make a frictional contact with the lower turned over annular edge of disk 22 of the line spool 20.

A headed screw bolt 55 that is screw mounted to the lever 56 projects through an elongated recess 57 formed in the lever 50, whereby to rock the lever 56 upon its fulcrum, when the lever 50 is rocked. The fulcrum comprises an upstanding pin 60 shouldered at 62 and riveted to the rim 61 of the plate 16, through which it projects. A coiled spring 63 surrounds the pin 60 and is disposed between the shoulder 62 and a shoe 80. The shoe 80 has an aperture 81 for the projection of pin 60. Its outer end 82 is bent upward to lay adjacent the under surface of lever 56 and its opposite end 83 has upstanding ears 84, 84 between which is disposed the inner end 65 of lever 56. The end 82 of shoe 80 is adapted to aid in returning lever 56 to normal position when forced down and the end 83 thereof forms a comparatively large bearing to aid in braking the rotation of disk 22. A sleeve 64 is mounted to the upper end of pin 60 and projects through the upper plate 15 and auxiliary casing 60ª. The inner end 65 of lever 56 is adapted to rest, as above stated, upon the upper surface of said shoe 80 which lays on the surface of disk 22 of the rotary line spool directly opposite the location of the brake shoe 54, whereby the end 65 and brake shoe 54 will co-operate to form a clamp that will stop the rotation of the rotary line spool 20 at the will of the user.

The outer end of the lever 56 is bent at an angle, as at 66, which is adapted to be projected temporarily into recess 57 formed in lever 50, when pressure is brought to bear at point 68 of said lever 56, whereby to lock the brake thus formed by end 65 and shoe 54 in open position to permit the rotary spool 20 to turn freely in either direction, as determined by the tension of the main spring 2 or by the pull on the line in the opposite direction. A pressure on the end 70 of the lever 50 will release the end 66 from recess 57 and, thereby, permit the brake to again operate.

In the event that the lever 50 is depressed too far, the shank of screw bolt 55 will abut against the end edge of recess 57 formed in lever 50 to arrest any further depression, which might, otherwise, damage the brake. Furthermore end 82 of shoe 80 will aid in preventing the abnormal depression of lever 50.

The extreme outer end of lever 50 has an aperture 90 adapted to provide a place for engaging the fish hook, not shown, temporarily, when not in use.

The operation of the reel is effected by first tying an end of the finishing line, not shown, around one of the shafts 23 of the line spool 20. The rotary drum —1— is wound to tighten the main spring 2. A slight pressure of the finger, then, on the end 70 of lever 50 will release the brake 20 causing the spool 20 to revolve to wind the line, not shown, thereon. While fishing, the free end of the line will be carried by rings in a fishing pole, also not shown, and when a fish is caught the fisherman will bring pressure to bear with his finger on the end 70 of lever 50 to allow the spool 20 to rotate to wind in the line upon said spool 20. While the brake is released thus, the spool will be free to turn, if forced, in either direction, either by means of the main spring 2 or by a pull on the line in the opposite direction in accordance with which force is the greater at the moment. This will give the fisherman opportunity to play the fish until the same becomes tired sufficiently to be pulled in and netted with a hand net. Should the user desire to lock the brake in open position, he will exert sufficient pressure upon the end 70 of lever 50 to cause the end 66 of lever 56 to drop into recess 57 formed in lever 50, where it will remain until, thereafter released by a still further pressure on end 70 of lever 50.

Having thus described my invention what I claim as new and desire to secure by Letters Patent is:

1. In an automatic fishing reel, a rotary line spool, a lever having formed therein a recess, a brake shoe, a second lever having a bent end for fitting into the recess of the first named lever, whereby to hold said levers in given relation to each other, and means permitting the depression of the first named lever, whereby to cause the bent end of the second named lever to fall into the recess of the first named lever to lock said levers in given relation, to stop the rotation of the spool.

2. In an automatic fishing reel, a rotary line spool, a lever having formed therein a recess, a second lever having a bent end adapted to fit into the recess of the first named lever, whereby to lock said levers in given relation to each other, means permitting the depression of the first named lever, whereby to cause the bent end of the second named lever to move into the recess of the first named lever to lock said levers in given relation, whereby to stop the rotation of the spool, and means permitting the further depression of the first named lever, whereby to unlock said levers to allow for the rotation of the spool.

3. In an automatic fishing reel, a rotary line spool, a lever carrying a pad, and having formed therein a recess, a brake shoe, a second lever having a bent end for fitting into the recess of the first named lever, whereby to hold said levers in given relation to each other, and means permitting the depression of the first named lever, whereby to cause the bent end of the second named lever to fall into the recess of the first named lever to lock said levers in given relation, whereby to stop the rotation of the spool, and means permitting the further depression of the first named lever, whereby to unlock said levers to allow for the rotation of the spool.

In testimony whereof I have affixed my signature.

ALFRED D. MAURY